United States Patent [19]

Yamamoto et al.

[11] Patent Number: 4,602,063
[45] Date of Patent: Jul. 22, 1986

[54] PRODUCTION OF REINFORCED RUBBER COMPOSITION

[75] Inventors: Shinji Yamamoto, Yotsukaido; Kohei Kaijiri, Chiba; Koichi Nagakura, Hirakata, all of Japan

[73] Assignee: Ube Industries, Ltd., Ube, Japan

[21] Appl. No.: 686,278

[22] Filed: Dec. 26, 1984

[30] Foreign Application Priority Data

Dec. 27, 1983 [JP] Japan .................................. 58-244814

[51] Int. Cl.$^4$ ........................ C08L 75/04; C08L 77/00
[52] U.S. Cl. .................................... 525/127; 152/151; 428/65; 525/128; 525/129; 525/133; 525/139
[58] Field of Search .............. 525/133, 139, 127, 128, 525/129; 264/176 R

[56] References Cited

U.S. PATENT DOCUMENTS 4,146,512  3/1979  Weaver et al. ................. 525/133 X

FOREIGN PATENT DOCUMENTS 0079718 11/1982  European Pat. Off. .

117044   7/1981  Japan .

Primary Examiner—Theodore E. Pertilla
Attorney, Agent, or Firm—Finnegan, Henderson, Farabow, Garrett & Dunner

[57] ABSTRACT

A process for producing a reinforced rubber composition comprising the steps of:

dispersing fine fibers of thermoplastic polymer having

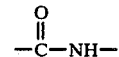

groups in a continuous phase comprising vulcanizable synthetic rubber, other than butadiene rubber, containing a tackifier incorporated thereinto; and grafting the vulcanizable synthetic rubber onto the thermoplastic polymer at the interface of the fine fibers through a novolak type phenol resin.

This reinforced rubber composition is capable of providing a vulcanizate having an excellent strength and modulus.

11 Claims, No Drawings

PRODUCTION OF REINFORCED RUBBER COMPOSITION

BACKGROUND OF THE INVENTION

1. Field of the Invention

The present invention relates to a process for producing a novel reinforced composition having an excellent productivity and workability and capable of providing a vulcanizate having an excellent strength and modulus, and also to a vulcanizate obtained therefrom.

2. Description of the Related Art

Reinforced rubber compositions used in tires have heretofore been prepared by incorporating short fibers made of, for example, nylon (i.e., polyamide), polyester, or formalized polyvinyl alcohol, into vulcanizable rubber. The reinforced rubber compositions thus produced, however, have a disadvantage in that the strength and modulus of the vulcanizates derived therefrom, especially at high elongation, are not sufficiently high. This is because the diameter of the fibers is large and no bonding occurs between the fibers and the rubber. Thus, there is a demand for the development of reinforced rubber compositions capable of providing vulcanizates having a higher strength and modulus.

Under these circumstances, Japanese Unexamined Patent Publication (Kokai) No. 53-8682 proposes both a process for reinforcing elastomer and a reinforced elastomer composition. According to this proposal, a fiber-forming polymer is mixed with rubber followed by extrusion of the resultant mixture. The reinforced rubber composition thus obtained, however, has the disadvantages of low tensile strength, low modulus at a high elongation, and low peeling strength which exhibits an adhesive force with other materials, of the vulcanizates thereof because fibers having a large diameter and film are formed and because no bonding occurs between the rubber and polymer (i.e., fiber) at the interface of the fibers and the rubber. Thus, a fiber-reinforced rubber composition suitable for use as parts of a tire cannot be obtained according to this proposal.

To improve conventional reinforced rubber compositions, the present inventors proposed a process for producing fiber-reinforced rubber compositions, in Japanese Patent Application No. 56-117044. According to this process, 100 parts by weight of vulcanizable rubber, 1 to 70 parts by weight of nylon having a number-average molecular weight of less than 200,000, and 0.2 to 2.5 parts by weight, based on 100 parts by weight of the total amount of the rubber and the thermoplastic polymer, of a resol type alkylphenol formaldehyde resin precondensate are mixed together at a temperature of not less than the melting point of the thermoplastic polymer, but not more than 270° C., the mixture is extruded from an extruder at a temperature of not less than the melting point of the thermoplastic polymer, but not more than 270° C., and the extrudate is drawn at a temperature of less than the melting point of the thermoplastic polymer.

However, this production process still involves practical disadvantages. For example, since a resol type alkylphenol resin capable of reacting with the rubber upon heating is used, the control of the graft reaction between the nylon and the rubber under heating is difficult. Also, the rubber usable in this process is limited to natural rubber, and nylon fibers having a large diameter are sometimes included in the rubber. Furthermore, when the amount of the nylon is more than 70 parts by weight based on 100 parts by weight of the rubber, the nylon is included in the form of film in the rubber. Thus, a reinforced rubber composition having only a small nylon content can be obtained and, therefore, the rubber product obtained by using, as a masterbatch composition, this reinforced rubber composition becomes expensive and does not have sufficiently satisfactory quality.

SUMMARY OF THE INVENTION

An object of the present invention is to eliminate the above-mentioned disadvantages of the prior art and to provide a process for producing a reinforced rubber composition capable of providing a vulcanizate having an excellent strength and modulus.

Other objects and advantages of the present invention will be apparent from the following description.

In accordance with the present invention, there is provided a process for producing a reinforced rubber composition comprising the steps of:

dispersing fine fibers of thermoplastic polymer having

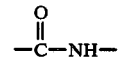

groups in a continuous phase comprising vulcanizable synthetic rubber, other than butadiene rubber, containing a tackifier incorporated thereinto; and grafting the vulcanizable synthetic rubber onto the thermoplastic polymer at the interface of the fine fibers through a novolak type phenol resin.

DESCRIPTION OF THE PREFERRED EMBODIMENTS

According to the present invention, a reinforced rubber composition having an excellent productivity and working properties and capable of providing a vulcanizate having an excellent modulus at both low and high elongation and an excellent tensile strength and adhesive force, can be produced.

It is essential in the present invention that a tackifier should be included in the vulcanizable synthetic rubber other than butadiene rubber.

The vulcanizable synthetic rubber usable in the present invention are those, with the exception of butadiene rubber, e.g., butadiene rubber (BR), styrene-butadiene rubber (SBR), and nitrile-butadiene rubber (NBR), which can be vulcanized to form rubber elastic articles. Typical examples of such rubber are polyisoprene (IR), polychloroprene (CR), butyl rubber (IIR), chlorinated butyl rubber (CIIR), brominated butyl rubber (BIIR), and ethylene-propylene rubber (EPDM). These synthetic rubbers can be used alone or in any mixture thereof. Of these materials, isoprene rubber (IR), butyl rubber (IIR), and ethylene-propylene rubber (EPDM) are preferably used in the present invention. The $ML_{1+4}$ (100° C.) of the vulcanizable synthetic rubber is preferably 30 to 200.

Tackifiers usable in the present invention are those which are compatible with the above-mentioned synthetic rubber, which exhibit the desired tackifying effect on the synthetic rubber, and which are not reactive with the synthetic rubber or which have a very low reactivity with the synthetic rubber (i.e., no substantial reaction occurs, upon heating, between the synthetic rubber and the tackifier). Typical examples of the tackifiers are cumarone resins such as cumaroneindene resin, non-reactive alkylphenol-formaldehyde resins, the rosin-modified products thereof, and modified abietic acid derivatives thereof, alkylphenol-acetylene resins, hydrogenated rosin and the modified products thereof, terpene-modified phenol resin and polyterpene resin, petroleum hydrocarbon resins such as polybutene, and rosin derivatives such as zinc resinate. These tackifiers can be used alone or in any mixture thereof.

The tackifier is preferably used in the present invention in an amount of 0.5 to 20 parts by weight, more preferably, 0.5 to 10 parts by weight, based on 100 parts by weight of the synthetic rubber other than butadiene rubber such as BR and SBR (i.e., "the synthetic rubber" hereinbelow).

The use of a too small amount of the tackifier tends to result in poor improvement in the modulus, whereas the use of a too large amount of the tackifier tends to results in the decrease in the strength and adhesion properties.

According to the present invention, the thermoplastic polymer having —(CO)—NH— groups can be dispersed in the form of fine fibers in the synthetic rubber, in spite of the use of the synthetic rubber, by including the tackifier in the specified synthetic rubber.

Thus, in the present invention, the above-mentioned vulcanizable synthetic rubber having the tackifier dispersed therein should be used as a continuous phase and the thermoplastic polymer having —(CO)NH— groups should be dispersed in the form of fine fibers in the continuous phase.

Typical examples of the above-mentioned thermoplastic polymers having

are those having a melting point of 170° C. to 235° C., preferably 190° C. to 225° C., and more preferably 200° C. to 220° C., for example, nylon such as nylon 6, nylon 610, nylon 12, nylon 611, and nylon 612; polyurea such as polyheptamethylene urea and polyundecamethylene urea; and polyurethane. These materials can be used alone or in any mixture thereof. Of these polymers, nylon is preferably used in the present invention. The thermoplastic polymers used in the present invention preferably have a number-average molecular weight of 200,000 or less. Furthermore, these polymers may be copolymers of monomers having —CONH group and monomers having the other groups.

According to the present invention, the thermoplastic polymer is preferably used in the present invention in an amount of 1 to 200 parts by weight, more preferably 30 to 200 parts by weight, based on 100 parts by weight of the synthetic rubber. The use of a too small amount of the thermoplastic polymer does not tend to improve the modulus, whereas the use of a too large amount of the thermoplastic polymer tends to result in the decrease in the strength and adhesion properties.

According to the present invention, a desired rubber composition capable of providing a vulcanizate having a large tensile strength and a large adhesive force to other substrates can be obtained by dispersing the specified thermoplastic polymer in the form of fine fibers in the above-mentioned synthetic rubber.

The fine fibers of the thermoplastic polymer dispersed in the above-mentioned vulcanizable synthetic rubber generally have an average diameter of 0.05 to 0.8 μm, preferably 0.05 to 0.3 μm. 90% by weight or more of these fine fibers should preferably have a diameter of not more than 1 μm and a circular cross-section. The length of the fibers is preferably 10 μm or more and 90% by weight or more of these fine fibers should preferably have a length of not more than 1000 μm.

Furthermore, according to the present invention, the above-mentioned thermoplastic polymer and vulcanizable synthetic rubber should be grafted through a novolak type phenol resin at the interface of the above-mentioned fibers and the synthetic rubber.

The novolak type phenol formaldehyde resins usable in the present invention are soluble and meltable resins, or their modified products, obtained from condensation reactions of phenols such as phenol or bisphenol with formaldehyde (or paraformaldehyde) in the presence of a known acidic catalyst such as sulfuric acid, hydrochloric acid, phosphoric acid, or oxalic acid. Typical examples of the novolak type phenol formaldehyde resins preferably usable in the present invention are novolak type phenol formaldehyde resin precondensates having the general formula

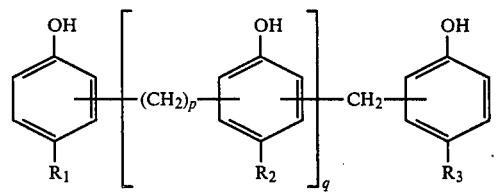

wherein $R_1$, $R_2$, and $R_3$ are independently a hydrogen atom, or an alkyl group having 1 to 15 carbon atoms, p is 1 or 2, and q is a number of 0 to 13; novolak type lactum-bisphenol F-formaldehyde resin precondensates; and novolak type styrenated phenol-phenol-formaldehyde resin precondensates.

The novolak type phenol formaldehyde resin is preferably used in an amount of 0.2 to 5 parts by weight, preferably 0.5 to 3 parts by weight, based on 100 parts by weight of the total amount of the synthetic rubber and the thermoplastic polymer. The use of a too small amount of the novolak type phenol formaldehyde resin tends to decrease the strength and adhesion properties, whereas the use of a too large amount of the novolak type phenol formaldehyde resin tends to result in the decrease in the modulus.

According to the preferred embodiment of the present invention, 100 parts by weight of the vulcanizable synthetic rubber, 1 to 20 parts by weight of the thermoplastic polymer, 0.5 to 20 parts by weight of the tackifier, 0.2 to 5 parts by weight, based on 100 parts by weight of the total amount of the synthetic rubber and the thermoplastic polymer, of the novolak type phenol resin, and 1 to 50 parts by weight, based on 100 parts by weight of the novolak type phenol resin, of a compound capable of providing formaldehyde upon heating (i.e., "a formaldehyde-producing compound") are mixed at a temperature of not less than the melting point of the thermoplastic, especially the melting point plus 5° C. or more but not more than 260° C., for 1 to 30 minutes, especially 1 to 15 minutes, by using, for example, a Brabender plastograph, Banbury mixer, or a roll mill, preferably under an inert gas atmosphere. The mixture is then extruded from an extruder at a temperature of, especially, not less than the melting point of the thermoplastic polymer but not more than 270° C., followed by winding. Thus, the thermoplastic polymer can be dispersed in the form of fine fibers in a continuous phase of the synthetic rubber and the thermoplastic polymer and the synthetic rubber are preferably grafted through the novolak type phenol resin at the interface of the fibers. In the above-mentioned process, the extruded strands can be wound (or taken off) and then the strands may be rolled (or stretched) at a temperature lower than the melting point of the thermoplastic polymer.

The formaldehyde-producing compounds usable in the present invention are those capable of producing formaldehyde upon heating. Examples of such compounds are hexamethylene tetramine, acetaldehyde ammonia having the formula

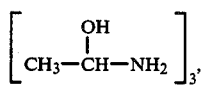

paraformaldehyde, α-polyoxymethylene, polyhydric methylol melamine derivatives, oxazolidine derivatives, and polyhydric methylol acetylene urea. These compounds can be used alone or in any mixture thereof.

The order of the addition of the above-mentioned components in the mixing step of the present invention is not specifically limited. However, the following method is most desirable. That is, the vulcanizable synthetic rubber and, optionally, an antioxidant are first charged into a mixing device to effect mastication of the rubber. Then, the thermoplastic polymer is charged into the mixing device to effect the mixing. The thermoplastic polymer is melted during the mixing and the tackifier and the novolak type phenol resin are then charged into the mixing device. After the mixing, the formaldehyde-producing compound is charged and the mixture is mixed for, for example, a further 1 to 30 minutes. As a result, the above-mentioned thermoplastic polymer can be finely and uniformly dispersed in the synthetic rubber having the tackifier incorporated thereinto and the synthetic rubber and the thermoplastic polymer are grafted through the novolak type phenol resin.

In the present invention, the preferable graft ratio of the reinforced rubber composition is 5% to 30% by weight, more preferably 10% to 30% by weight. The term "graft ratio" used herein means the percent ratio of the weight of the vulcanizable synthetic rubber graft bonded to the fibers of the thermoplastic polymer in an interface of the fibers to the weight of the thermoplastic polymer fibers in the vulcanizable synthetic rubber (i.e., synthetic rubber/thermoplastic polymer fiber × 100).

Furthermore, to prevent gelation of the vulcanizable synthetic rubber during the mixing step and the subsequent extruding step, a conventional low volatile antioxidant (i.e., an aging prevention agent) can be compounded to the vulcanizable synthetic rubber. Examples of such antioxidants are N-(3-methacryloyloxy-2-hydroxypropyl)-N'-phenyl-p-phenylenediamine, phenyl-α-naphthylamine, phenyl-β-naphthylamine, N,N'-diphenyl-p-phenylenediamine, N-isopropyl-N'-phenyl-p-phenylenediamine, N-cyclohexyl-N'-phenyl-p-phenylenediamine, 2,6-di-tert-butyl-4-methylphenol, 2,6-di-tert-butyl-α-dimethylamine-p-cresol, and 2,2'-dihydroxy-3,3'-di(α- methylcyclohexyl)-5,5'-dimethyl-diphenylmethane.

The extrusion of the mixture may be carried out through, for example, a circular die or a rectangular die to form an extrudate in the form of a strand or sheet.

Where a circular die is used, a die having an extruding nozzle with an inner diameter of 0.1 to 5 mm and a ratio (L/D) of length (L) to the inner diameter (D) of 1 to 20 is preferable. Where a rectangular die is used, a die having a slit gap of 0.1 to 5 mm, a width of 0.2 to 200 mm, and a die land length of 10 to 20 mm is preferable. For practical use, the circular die is most desirable. Circular dies having either one extruding nozzle or many extruding nozzles (i.e., multifold type) can be used in the practice of the present invention.

The mixture obtained above is then extruded by any conventional extruding means such as a screw type extruder. Preferably, the extrusion can be carried out at a screw tip temperature of not less than the melting point of the thermoplastic polymer but not more than 270° C. and at a die temperature of not less than the melting point, more preferably not less than the melting point plus 5° C., of the thermoplastic polymer but not more than 270° C., more preferably not more than 260° C.

The extrudate of the present reinforced rubber composition extruded from the extrusion nozzles is first cooled to a temperature of less than the melting point of the thermoplastic polymer by air cooling, water cooling, or inert solvent cooling (e.g., cooling in which cooled methanol is used) or by making the distance between the die and the winding machine (or take-up machine) longer, with or without stretching, preferably while the extrudate is continuously stretched. The cooled extrudate is wound by a winding machine such as a bobbin or take-up rolls at a winding speed of, for example, 1 to 100 m/min, more preferably 5 to 100 m/min. The preferable temperature of the winding machine during winding of the strands is 0° C. to 100° C. When the strands are stretched, the desirable reinforced rubber composition can be obtained by cooling, stretching, and winding the strands.

According to the present invention, the graft reaction of the synthetic rubber and the thermoplastic polymer can be best effected through the novolak type phenol resin and, since breakage of the strands rarely occurs during the extrusion, a long run operation and a reinforced rubber composition providing a vulcanizate having excellent fatigue properties can be obtained.

The reinforced rubber composition of the present invention can be vulcanized to form a vulcanizate, i.e., a reinforced elastic product. The reinforced rubber composition can be vulcanized alone or together with an added vulcanizable rubber.

The vulcanizing agents usable in vulcanization of the present reinforced rubber composition can be any conventional vulcanizing agent such as sulfur, organic peroxides, and sulfur-containing compounds. The compounding of the vulcanizing agent into the reinforced rubber composition can be carried out in any conventional manner. The desirable amount of the vulcanizing agent is 0.5 to 10 parts by weight based on 100 parts by weight of the rubber.

Various conventional additives also can be used in the vulcanization of the present reinforced rubber composition. Examples of such additives are: reinforcing agents such as various grades of carbon black, white carbon, activated calcium carbonate, ultrafine powdered magnesium silicate, high styrene resin, cumarone-indene resin, phenol resin, lignin, modified melamine resin, and petroleum resin; fillers such as various grades of calcium carbonate, basic magnesium carbonate, clay, zinc oxide, diatomaceous earth, reclaimed rubber, powdered rubber, and ebonite powder; vulcanization accelerators such as aldehyde ammonias, aldehydeamines, guanidines, thioureas, thiazoles, thiurams, dithiocarbamates, and xanthates; vulcanization accelerator aids such as metal oxides and fatty acid; and antioxidants such as aminealdehydes, amineketones, amines, phenols, imidazoles, sulfur-containing and phosphorus-containing antioxidants, vulcanization retarders, and flame retarders.

The vulcanization per se can be carried out by any conventional method. Although the vulcanization temperature largely depends on the kind of the vulcanizable rubber to be vulcanized and the intended use of the vulcanizate, it is generally 150° C. to 180° C.

The vulcanizate thus obtained, has an excellent modulus at both low and high elongation, an excellent tensile and tear strength, and excellent adhesion properties and fatigue characteristics. Therefore, the reinforced rubber composition of the present invention can be suitably used as tire inner members such as belts, carcasses, and beads; tire outer members such as treads and sidewalls; industrial applications such as belts and hoses; footwear; and golf balls.

EXAMPLES

The present invention will now be further illustrated by, but is by no means limited to, the following examples, wherein all parts and percentages are expressed on a weight basis unless otherwise specified. The physical properties of vulcanizates obtained from reinforced rubber compositions of the following examples were determined according to JIS (Japanese Industrial Standards) K 6301 methods.

The novolak type phenol-formaldehyde resin precondensate (i.e., "550 PL" hereinbelow) used in the following Examples is a commercially available product manufactured by Plastic Industries Ltd. This powder crystalline novolak type phenol-formaldehyde, which is prepared from the condensation reaction of phenol and paraformaldehyde in the presence of a oxalic acid catalyst, has a softening point of 106° C., a water content of 0.12% by weight, and a free phenol content of 0.12% by weight.

Example 1

A 100 parts of isoprene rubber having a $ML_{1+4}$ (100° C.) of 90 (Kuraprene IR10 manufactured by Kurarey Co., Ltd.) was charged into a Banbury mixer set at 100° C. under $N_2$ atmosphere and at a rotor revolution number of 155 rpm and was masticated for 30 seconds. The $M_{1+4}$ (100° C.) of the resultant rubber was 60. Then, 1.0 part of N-(3-methacryloyloxy-2-hydroxypropyl)-N'-phenyl-p-phenylenediamine (Nocrac G-1, Ouchi-Shinko Chemical Industry Co., Ltd.) and 100 parts of 6-nylon (m.p. =221° C., molecular weight 30000) were charged into the Banbury mixer and mixed for 3 minutes. Furthermore, 2 parts of a tackifier, Tamanol 510 (non-reactive alkylphenol-formaldehyde resin manufactured by Arakawa Chemical Industry Co., Ltd.) and 1.5 part of novolak 550 PL were charged into the Banbury mixer and mixed for 2 minutes. Thereafter, 0.15 parts of hexamethylenetetramine was charged into the Banbury mixer and mixed for 2.5 minutes. During the mixing, the temperature of the mixture in the Banbury mixer was raised to about 230° C. The mixture was then dumped from the Banbury mixer.

The mixture thus obtained was extruded under nitrogen from a 30 mm$\phi$ extruder provided with a 6 hole circular die having an inner nozzle diameter of 2 mm and a ratio (L/D) of a length L to an inner diameter D of 2 at a die temperature of 245° C. Thus, the mixture was extruded in the form of a strand. The strand was wound through guide rolls onto a bobbin located 3 m below and at a position perpendicularly downward from the nozzle and guide rolls, at a draft ratio of 10 and a winding speed of 20 m/min. Thus, the desired reinforced rubber composition (i.e., masterbatch composition) was prepared.

Determination of Graft Ratio

A 2 g amount of the reinforced rubber composition obtained in Example 1 obtained above was added to 200 ml of benzene at a room temperature and the rubber content in the composition was dissolved in benzene. The slurry thus obtained was centrifugally separated at a room temperature into a solution portion and a precipitation portion. The precipitation portion was repeatedly subjected to the above-mentioned procedure seven times. Thereafter, the final precipitation portion obtained was dried to obtain nylon fiber. The nylon fiber thus obtained was dissolved in a mixed solvent of phenol and ortho-dichlorobenzene (at a weight ratio of 1:3) and was analyzed according to a $^1H$ nuclear magnetic resonance (NMR) spectrum analysis, using tetramethylsilane as an internal standard. From the NMR chart, a mol ratio of the 6-nylon and natural rubber was determined by measurement of the area of the signals of the methyl and methylene groups derived from natural rubber, the methylene group adjacent to the CO group, the methylene group adjakent to the NH group, and the other three methylene groups, derived from the 6-nylon. Thus obtaining the calculated graft ratio. The shape of the nylon fiber was observed by a scanning electron microscope (manufactured by Hitachi, Ltd.) at a magnification time of 10,000. The fiber was extremely fine and had a circular cross-section.

The results are shown in Table 1 below. Evaluation test The reinforced rubber composition obtained above was vulcanized at a tempature of 150° C. for a period of 40 minutes, according to the formulation shown below. The results are also shown in Table 1.

| Formulation | | |
|---|---|---|
| Reinforced rubber composition | Total rubber content = | 100 parts |
| Natural rubber ($1 \times 10^6$ poise) | 6-Nylon content = 4 PHR | |
| Carbon black (ISAF)*[1] | | 50 parts |
| Process oil (Aromatic oil) | | 5 parts |
| Zinc oxide | | 5 parts |
| Stearic acid | | 3 parts |
| N—phenyl-N'—isopropyl-p-phenylenediamine (810 NA)*[2] | | 1.2 parts |
| 2,2,4-Trimethyl-1,2-dihydroquinoline polymer (Norac 224)*[3] | | 0.8 parts |
| Dibenzothiazyl disulfide | | 0.6 parts |
| N,N'—diphenylguanidine | | 0.2 parts |
| Sulfur | | 2.5 parts |

*[1]manufactured by Mitsubishi Chemical Industries, Ltd.
*[2]manufactured by Mitsubishi Chemical Industries, Ltd.
*[3]manufactured by Ouchi-Shinko Chemical Ind. Co., Ltd.

Examples 2 to 4

Reinforced rubber compositions were prepared in the same manner as in Example 1, except that the addition amounts of novolak 550 PL and Tamanol 510 were changed as shown in Table 1. The addition amount of hexamethylenetetramine was 10% by weight based on the weight of the novolak 550 PL (This was the same as in the following examples).

The results are shown in Table 1.

Comparative Example 1

A reinforced rubber composition was prepared in the same manner as in Example 1, except that no Tamanol 510 was used and that the ratio of 6-nylon to isoprene rubber was changed as shown in Table 1.

The results are shown in Table 1.

Reference Example 1

The physical properties of a vulcanizate obtained from natural rubber and polyisoprene in the same compounding ratio as in Example 1 are shown in Table 1.

amounts of 6-nylon, novolak 550 PL, and Tamanol 510 were changed as shown in Table 2.

The results are shown in Table 2.

Examples 8 to 11

Reinforced rubber compositions were prepared in the same manner as in Example 1, except that the types of tackifier were changed.

The results are shown in Table 3.

Examples 12 and 13

Reinforced rubber compositions were prepared in the same manner as in Example 1, except that the types of the synthetic rubber and the addition amounts of 6-nylon, novolak 550 PL, and Tamanol 510 were changed as shown in Table 4.

The results are shown in Table 4.

TABLE 1

|  |  | Example 1 | Example 2 | Example 3 | Example 4 | Comparative Example 1 | Reference Example 1 |
|---|---|---|---|---|---|---|---|
| Masterbatch composition | 6-Nylon (part) | 100 | 100 | 100 | 100 | 100 | — |
|  | IR (part) | 100 | 100 | 100 | 100 | 100 | — |
|  | 550 PL (part) | 1.5 | 3 | 5 | 3 | 3 | — |
|  | Tackifier (part) | 2 | 2 | 2 | 3 | 0 | — |
|  | Type of tackfier | Tamanol 510 | Tamanol 510 | Tamanol 510 | Tamanol 510 | — | — |
| Properties of masterbatch | Draft ratio | 10 | 10 | 10 | 10 | 1 (impossible draft) | — |
|  | Extrusion conditions | Smooth (no strand cut) | Smooth (no strand cut) | Smooth (no strand cut) | Smooth (no strand cut) |  |  |
|  | Shape of fiber | Fine fiber | Fine fiber | Fine fiber | Fine fiber | particulate | — |
|  | Graft % | 8 | 16 | 17 | 17 | 16 | — |
|  | Continuous phase | Synthetic rubber | Synthetic rubber | Synthetic rubber | Synthetic rubber | Synthetic rubber | — |
| Properties of vulcanizate (fiber content = 4 PHR) | $M_{50}$ (kg/cm$^2$) | 49 | 50 | 43 | 45 | 22 | 16 |
|  | $M_{100}$ (kg/cm$^2$) | 81 | 79 | 76 | 77 | 40 | 31 |
|  | $M_{200}$ (kg/cm$^2$) | 125 | 128 | 127 | 125 | 93 | 81 |
|  | $M_{300}$ (kg/cm$^2$) | 185 | 188 | 188 | 187 | 156 | 144 |
|  | $T_B$ (kg/cm$^2$) | 315 | 318 | 310 | 312 | 307 | 312 |
|  | $E_B$ (%) | 490 | 490 | 490 | 490 | 510 | 550 |
|  | Peeling Strength (kg)*[1] | ≧50 | >50 | >50 | >50 | >50 | >50 |

*[1] Adhesion force against vulcanizate of natural rubber.

Examples 5 to 7

Reinforced rubber compositions were prepared in the same manner as in Example 1, except that the amounts of 6-nylon, novolak 550 PL, and Tamanol 510, which were charged into the Banbury mixer, were changed as shown in Table 2.

The results are shown in Table 2.

Comparative Example 2

A reinforced rubber composition was prepared in the same manner as in Example 1, except that the addition In all Examples shown above, no breakage of the strands occurred when the strands were continuously taken off for 2 hours.

In each Example according to the present invention, the fine fibers of the thermoplastic polymer dispersed in the vulcanizable synthetic rubber were in the form of a circular cross-section. 100% by weight of these fine fibers had a diameter of 1 μm or less and an average diameter of about 0.2 μm and 90% by weight or more of these fine fibers had a length of 1000 μm or less.

TABLE 2

|  |  | Example 5 | Example 6 | Example 7 | Comparative Example 2 |
|---|---|---|---|---|---|
| Masterbatch composition | 6-Nylon (part) | 125 | 151 | 184 | 220 |
|  | IR (part) | 100 | 100 | 100 | 100 |
|  | 550 PL (part) | 3.38 | 3.77 | 4.26 | 4.8 |
|  | Tackifier (part) | 2.25 | 2.51 | 2.84 | 3.2 |
|  | Type of tackifier | Tamanol 510 | Tamanol 510 | Tamanol 510 | Tamanol 510 |
| Properties of masterbatch | Draft ratio | 10 | 10 | 10 | 10 |
|  | Extrusion conditions | Smooth (no strand cut) | Smooth (no strand cut) | Smooth (no strand cut) |  |
|  | Shape of fiber | Fine fiber | Fine fiber | Fine fiber | Thick fiber |
|  | Graft % | 16 | 15 | 16 | Not detectable |
|  | Continuous phase | Synthetic rubber | Synthetic rubber | Synthetic rubber | 6-Nylon |
| Properties of vulcanizate (fiber content = 4 PHR) | $M_{50}$ (kg/cm$^2$) | 43 | 42 | 49 | 38 |
|  | $M_{100}$ (kg/cm$^2$) | 73 | 74 | 80 | 58 |
|  | $M_{200}$ (kg/cm$^2$) | 121 | 124 | 126 | 99 |
|  | $M_{300}$ (kg/cm$^2$) | 182 | 186 | 189 | 158 |
|  | $T_B$ (kg/cm$^2$) | 307 | 316 | 303 | 220 |

TABLE 2-continued

|  |  | Example 5 | Example 6 | Example 7 | Comparative Example 2 |
|---|---|---|---|---|---|
|  | $E_B$ (%) | 480 | 500 | 450 | 390 |
|  | Peeling strength (kg) | >50 | >50 | 50 | 19 |

TABLE 3

|  |  | Example 8 | Example 9 | Example 10 | Example 11 |
|---|---|---|---|---|---|
| Masterbatch composition | 6-Nylon (part) | 100 | 100 | 100 | 100 |
|  | IR (part) | 100 | 100 | 100 | 100 |
|  | 550 PL (part) | 3 | 3 | 3 | 3 |
|  | Tackifier (part) | 2 | 2 | 2 | 2 |
|  | Type of tackifier | Tackace A100*[1] | Polystar 2115*[2] | Cumarone V120* | Zinc Resin*[4] |
| Properties of masterbatch | Draft ratio | 10 | 10 | 10 | 10 |
|  | Extrusion conditions | Smooth (no strand cut) | Smooth (no strand cut) | Smooth (no strand cut) | Smooth (no strand cut) |
|  | Shape of fiber | Fine fiber | Fine fiber | Fine fiber | Fine fiber |
|  | Graft % | 16 | 14 | 13 | 15 |
|  | Continuous phase | Synthetic rubber | Synthetic rubber | Synthetic rubber | Synthetic rubber |
| Properties of vulcanizate (fiber content = 4 PHR) | $M_{50}$ (kg/cm$^2$) | 33 | 30 | 34 | 40 |
|  | $M_{100}$ (kg/cm$^2$) | 64 | 59 | 61 | 72 |
|  | $M_{200}$ (kg/cm$^2$) | 119 | 112 | 114 | 121 |
|  | $M_{300}$ (kg/cm$^2$) | 186 | 177 | 178 | 183 |
|  | $T_B$ (kg/cm$^2$) | 316 | 315 | 312 | 311 |
|  | $E_B$ (%) | 490 | 500 | 490 | 490 |
|  | Peeling strength (kg) | >50 | >50 | >50 | >50 |

*[1] Petroleum hydrocarbon manufactured by Mitsui Petrochemical
*[2] Yasuharayushi Kogyo Co., Ltd.
*[3] Nittetsu Chemical Industries Co., Ltd.
*[4] Arakawa Chemical Industries Co., Ltd.

TABLE 4

|  |  | Example 12 | Example 13 |
|---|---|---|---|
| Masterbatch compsition | 6-Nylon (part) | 50 | 50 |
|  | Synthetic rubber (part) | 100 (IIR)*[1] | 100 (EPDM)*[2] |
|  | 550 PL (part) | 2.25 | 2.25 |
|  | Tackifier (part) | 1.6 | 1.6 |
|  | Type of tackifier | Tamanol 510 | Tamanol 510 |
| Properties of masterbatch | Draft ratio | 10 | 10 |
|  | Extrusion conditions | Smooth (no strand cut) | Smooth (no strand cut) |
|  | Shape of fiber | Fine fiber | Fine fiber |
|  | Graft % | 8 | 6 |
|  | Continous phase | Synthetic rubber | Synthetic rubber |
| Properties of vulcanizate (fiber content = 4 PHR) | $M_{50}$ (kg/cm$^2$) | 49 | 49 |
|  | $M_{100}$ (kg/cm$^2$) | 70 | 69 |
|  | $M_{200}$ (kg/cm$^2$) | 114 | .110 |
|  | $M_{300}$ (kg/cm$^2$) | 173 | 166 |
|  | $T_B$ (kg/cm$^2$) | 281 | 286 |
|  | $E_B$ (%) | 470 | 460 |
|  |  | >50 | >50 |

*[1] Esso butyl 365 manufactured by Esso Co.
*[2] JSR EP 33 manufactured by Japan Synthetic Rubber Co., Ltd.

We claim:

1. A process for producing a reinforced rubber composition comprising the steps of:
mixing 100 parts by weight of a vulcanizable synthetic rubber other than butadiene rubber, 1 to 200 parts by weight of a thermoplastic polymer having $$-\overset{O}{\underset{\|}{C}}-NH-$$

groups, 0.5 to 20 parts by weight of a tackifier, 0.2 to 5 parts by weight, based on 100 parts by weight of the total amount of the synthetic rubber and the thermoplastic polymer, of a novolak resin, and 1 to 50 parts by weight, based on 100 parts by weight of the novolak resin, of a compound capable of providing formaldehyde upon heating at a temperature of not less than the melting point of the thermoplastic polymer but not more than 270° C.;
extruding the resultant mixture from an extruder, followed by taking-off or winding the extruded strand to thereby disperse the thermoplastic polymer in the form of fine fibers in a continuous phase comprising the synthetic rubber; and
grafting the vulcanizable synthetic rubber onto the thermoplastic polymer at the interface of the fine fibers through the novolak resin.

2. A process as claimed in claim 1, wherein said vulcanizable synthetic rubber is at least one selected from the group consisting of polyisoprene, polychloroprene, butyl rubber, chlorinated butyl rubber, brominated butyl rubber and ethylene-propylene rubber (EPDM).

3. A reinforced rubber composition produced by the process of claim 1.

4. A vulcanizate derived from the reinforced rubber composition of claim 3.

5. A process as claimed in claim 1 wherein said novolak resin is at least one selected from the group consisting of soluble and meltable resins and their modified products, obtained from condensation reactions of phenols with formaldehyde or paraformaldehyde in the presence of an acidic catalyst.

6. A process as claimed in claim 1 wherein said tackifier is at least one selected from the group consisting of cumarone resins, non-reactive alkylphenol-formaldehyde resins and the resin-modified products thereof and modified abietic acid derivatives thereof, alkylphenol-acetylene resins, hydrogenated resins and the modified products thereof, terpene-modified phenol resins and polyterpene resins, petroleum hydrocarbon resins, and rosin derivatives.

7. A process as claimed in claim 1 wherein said thermoplastic polymer having

groups is at least one selected from the group consisting of nylon, polyurea and polyurethane.

8. A process as claimed in claim 1 wherein said compound capable of providing a formaldehyde upon heating is at least one selected from the group consisting of hexamethylene tetramine, acetaldehyde ammonia, paraformaldehyde, α-polyoxymethylene, a polyhydric methylol melamine derivative, an oxazolidine derivative and polyhydric methylol acetylene urea.

9. A process as claimed in claim 1 wherein said vulcanizable synthetic rubber is an ethylene-propylene rubber, said thermoplastic polymer is a nylon, said tackifier is a non-reactive alkyl-phenol-formaldehyde resin, said novolak resin is a condensation product of a phenol and formaldehyde and said compound capable of providing formaldehyde upon heating is hexamethylene tetramine.

10. A process as claimed in claim 1 wherein said vulcanizable synthetic rubber is an isoprene rubber, said thermoplastic polymer is a nylon, said tackifier is a non-reactive alkyl-phenol-formaldehyde resin, said novolak resin is a condensation product of a phenol and formaldehyde and said compound capable of providing formaldehyde upon heating is hexamethylene tetramine.

11. A process as claimed in claim 1 wherein said fibers have an average diameter of 0.05 to 0.8 μm.

* * * * *